(12) United States Patent　　(10) Patent No.:　US 12,603,544 B2
Kiyokawa et al.　　　　　　　(45) Date of Patent:　Apr. 14, 2026

(54) CONNECTION STRUCTURE

(71) Applicant: TOYOTA JIDOSHA KABUSHIKI KAISHA, Toyota (JP)

(72) Inventors: Yoji Kiyokawa, Okazaki (JP); Keisuke Yuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 160 days.

(21) Appl. No.: 18/400,306

(22) Filed: Dec. 29, 2023

(65) Prior Publication Data

US 2024/0291345 A1　　Aug. 29, 2024

(30) Foreign Application Priority Data

Feb. 27, 2023　(JP) ................................. 2023-028567

(51) Int. Cl.
　　*H02K 11/33*　　　(2016.01)
　　*H02K 5/22*　　　(2006.01)
　　*B60L 15/00*　　　(2006.01)
　　*B60R 16/02*　　　(2006.01)
　　*H02M 7/00*　　　(2006.01)

(52) U.S. Cl.
　　CPC ............. *H02K 5/225* (2013.01); *H02K 11/33* (2016.01); *B60L 15/007* (2013.01); *B60R 16/0207* (2013.01); *H02M 7/003* (2013.01)

(58) Field of Classification Search
　　CPC ........ H02K 5/225; H02K 11/30; H02K 11/33; H02K 5/22; B60R 16/0207; H02M 7/003; B60L 15/007
　　USPC .......................................................... 310/71
　　See application file for complete search history.

(56) References Cited

U.S. PATENT DOCUMENTS

| | | |
|---|---|---|
| 2018/0345820 A1 | 12/2018 | Hatami |
| 2019/0016208 A1* | 1/2019 | Tomokage ............. H02K 11/33 |
| 2020/0207223 A1* | 7/2020 | Kikuchi ................... B60L 53/16 |
| 2024/0300347 A1* | 9/2024 | Fujimura ................ B60L 58/26 |

FOREIGN PATENT DOCUMENTS

| | | |
|---|---|---|
| JP | 2019-022284 A | 2/2019 |
| JP | 6582327 B2 | 10/2019 |

* cited by examiner

*Primary Examiner* — Alexander A Singh
(74) *Attorney, Agent, or Firm* — SoraIP, Inc.

(57)　　ABSTRACT

A connection structure of the present disclosure includes a housing that houses an inverter that controls a rotary electric machine, a first connector provided in the housing and to which a first cable connected to a battery is connected, a second connector provided in the housing and to which a second cable connected to a device that supplies electric power is connected, a first path that electrically connects the first connector and the inverter, and a second path that electrically connects the first path and the second connector.

2 Claims, 2 Drawing Sheets

CONNECTION STRUCTURE

CROSS-REFERENCE TO RELATED APPLICATION

This application claims priority to Japanese Patent Application No. 2023-028567 filed on Feb. 27, 2023 incorporated herein by reference in its entirety.

BACKGROUND

1. Technical Field

The present disclosure relates to a connection structure.

2. Description of Related Art

Japanese Patent No. 6582327 (JP 6582327 B) discloses a configuration in which electric power is branched from a battery included in an electrified vehicle. In the electrified vehicle, a positive electrode line and a negative electrode line are branched into two within a battery case that houses the battery, and one branched line is electrically connected to a charging circuit, a quick charging circuit, and an air compressor via a first cable and a branch unit, and the other branched line is electrically connected to an inverter unit via a power cable.

SUMMARY

In the disclosure disclosed in JP 6582327 B, when supplying electric power from the battery, two cables that are a first cable that connects the battery and the branch unit and a power cable that connects the battery and the inverter unit are used. Therefore, the quantity of cables increases, and routing becomes complicated in a limited space inside a vehicle. Further, the increased quantity of cables increases the cost and also the weight of the vehicle.

The present disclosure has been made in view of the above, and an object of the present disclosure is to reduce the quantity of cables connected to the battery while transmitting and receiving electric power.

A connection structure according to the present disclosure includes a housing that houses an inverter that controls a rotary electric machine, a first connector provided in the housing and to which a first cable connected to a battery is connected, a second connector provided in the housing and to which a second cable connected to a device that supplies electric power is connected, a first path that electrically connects the first connector and the inverter, and a second path that electrically connects the first path and the second connector.

Accordingly, it is possible to transmit and receive electric power to and from the inverter and to supply electric power from the device to the battery while reducing the quantity of cables connected to the battery.

Further, in the above, the second cable may include a third connector connected to the second connector, a supply cable that supplies electric power to the third connector, and an output cable that outputs electric power from the third connector, and the third connector may include a third path that electrically connects the second path and the supply cable, and a fourth path that electrically connects the third path and the output cable.

Accordingly, it is possible to reduce the number of connectors provided in the housing and supply electric power to a device that consumes electric power.

Further, in the above, the housing may be disposed above the rotary electric machine, and the first connector may be provided on a side surface of the housing above the rotary electric machine.

Accordingly, it is possible to shorten a path from the rotary electric machine to the first connector via the inverter and the first path.

The connection structure according to the present disclosure has an effect of being able to reduce the quantity of cables connected to the battery while transmitting and receiving electric power.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
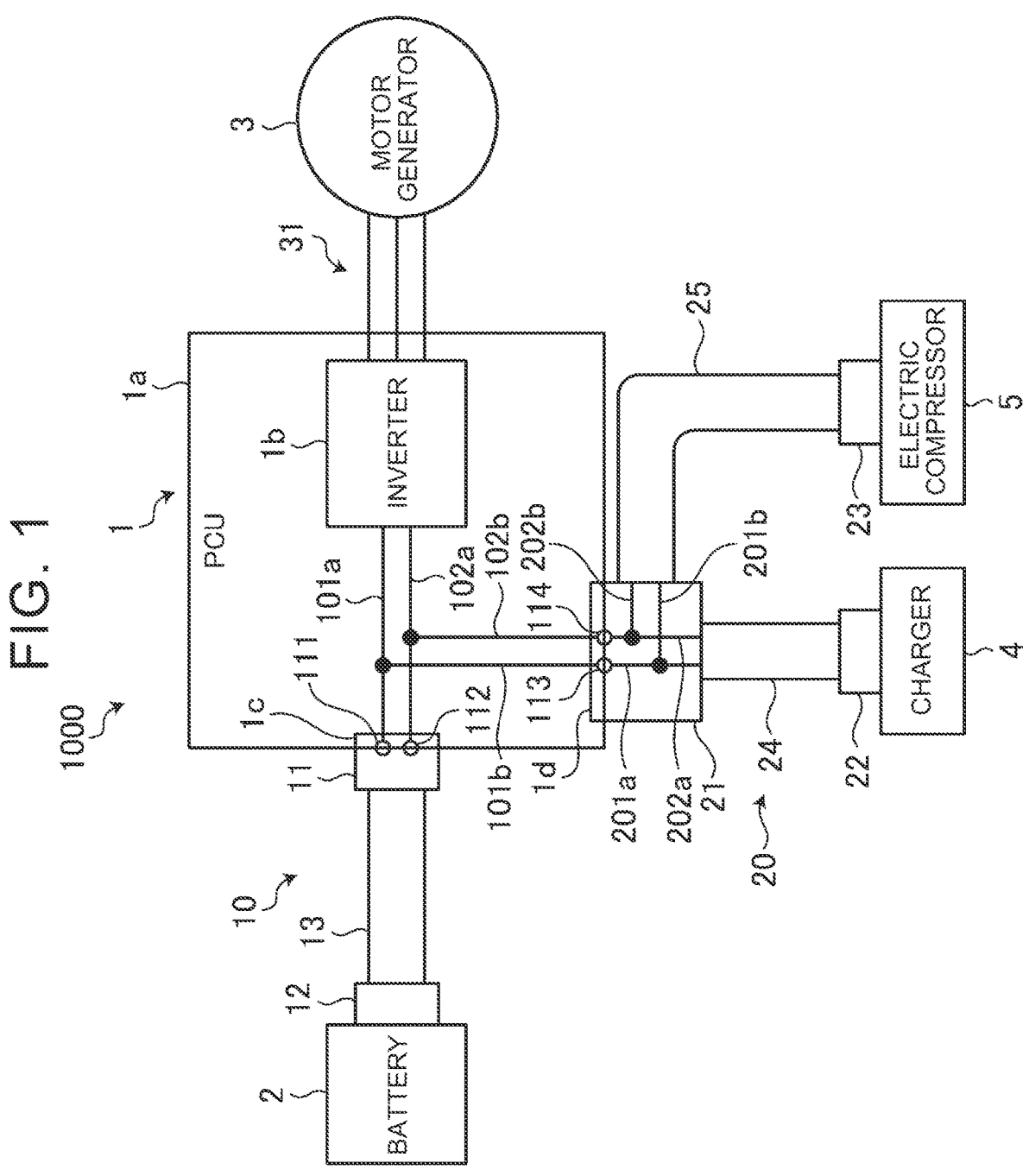
FIG. 1 is a schematic diagram of a connection structure according to an embodiment.

Embodiments of the present disclosure will be described in detail below based on the drawings. Note that the present disclosure is not limited to the embodiments described below. Furthermore, in the description of the drawings, the same or corresponding elements are given the same reference numerals as appropriate. Furthermore, it should be noted that the drawings are schematic and the relationship between dimensions of each element may differ from reality. Drawings may also include portions that differ in dimensional relationships and ratios.

The connection structure according to the embodiment of the present disclosure is applicable to a vehicle that runs on electric power, such as a Hybrid Electric Vehicle (HEV), Battery Electric Vehicle (BEV), Plug-in Hybrid Electric Vehicle (PHEV), or Fuel Cell Electric Vehicle (FCEV), but a case will be mainly described below in which it is installed in a plug-in hybrid electric vehicle (PHEV).

FIG. 1 is a diagram schematically showing an example of a connection structure 1000 included in a vehicle according to an embodiment. The vehicle includes a Power Control Unit (PCU) 1, a battery 2, a motor generator 3, a charger 4, and an electric compressor 5. Connection structure 1000 is a structure that electrically connects an inverter 1b, a battery 2, a charger 4, and an electric compressor 5.

The battery 2 is a chargeable and dischargeable battery mounted on a vehicle. The battery 2 is placed, for example, under a seat of a vehicle. The first cable 10 is a cable that connects the battery 2 and the PCU 1. The first cable 10 includes an electric wire 13, a male connector 11 provided at one end of the electric wire 13, and a connector 12 provided at the other end of the electric wire 13. A connector 12 is connected to the battery 2. A connector 11 is connected to terminals 111 and 112 provided in the PCU 1. The positive electrode of the battery 2 and the terminal 111 are electrically connected through the electric wire 13, and the negative electrode of the battery 2 and the terminal 112 are electrically connected through the electric wire 13.

PCU 1 is a power control unit that controls electric power within the vehicle. PCU 1 is placed, for example, in the engine compartment of a vehicle. The PCU 1 has a housing 1a, and has an inverter 1b, a first positive electrode wire 101a, a first negative electrode wire 102a, a second positive electrode wire 101*b*, and a second negative electrode wire 102*b* inside the housing 1*a*. It has connectors 1*c* and 1*d* on a side surface of the housing 1*a*. Connector 1*c*, which is an example of a first connector, is a female connector that includes terminals 111 and 112 that are electrically conductive. Connector 1*d*, which is an example of the second connector, is a female connector that includes conductive terminals 113 and 114. The first positive electrode wire 101*a*, which is a conductor, electrically connects the terminal 111 and the inverter 1*b*. The first negative electrode wire 102*a*, which is a conductor, electrically connects the terminal 112 and the inverter 1*b*. The second positive electrode wire 101*b*, which is a conductor, electrically connects the first positive electrode wire 101*a* and the terminal 113. The second negative electrode wire 102*b*, which is a conductor, electrically connects the first negative electrode wire 102*a* and the terminal 114. The first positive electrode wire 101*a* and the first negative electrode wire 102*a* are an example of the first path according to the present disclosure. The second positive electrode wire 101*b* and the second negative electrode wire 102*b* are an example of the second path according to the present disclosure. The intersection between the first positive electrode wire 101*a* and the second positive electrode wire 101*b* and the intersection between the first negative electrode wire 102*a* and the second negative electrode wire 102*b* are examples of the first branch portion according to the present disclosure.

The inverter 1*b* is an inverter capable of mutually converting DC power and three-phase AC power. Inverter 1*b* is connected to motor generator 3 by, for example, a three-phase bus bar 31. The inverter 1*b* converts the DC power supplied from the battery 2 via the first cable 10, the terminal 111, the terminal 112, the first positive electrode wire 101*a* and the first negative electrode wire 102*a* into three-phase AC power, and supplies the power to the motor generator 3. Further, the inverter 1*b* converts the three-phase AC power supplied from the motor generator 3 into DC power, and supplies the DC power via the first cable 10, the terminal 111, the terminal 112, the first positive electrode wire 101*a*, and the first negative electrode wire 102*a*. Power is supplied to the battery 2.

The motor generator 3 is a rotary electric machine mounted on a vehicle, and is arranged below the PCU 1, for example. When the motor generator 3 is supplied with three-phase AC power from the inverter 1*b*, it acts as a motor and generates a driving force for driving the vehicle. This generated driving force is transmitted to the drive wheels via a power transmission device included in the vehicle. Further, the motor generator 3 acts as a generator when the vehicle is braked, recovers braking energy, and supplies three-phase AC power to the inverter 1*b*. The battery 2 is charged by converting this three-phase AC power into DC power by the inverter 1*b* and supplying the DC power to the battery 2.

The second cable 20 is a cable that connects the charger 4 and the PCU 1 and connects the electric compressor 5 and the PCU 1. The second cable 20 includes connectors 21, 22, 23 and electric wires 24, 25. The electric wire 24 has one end connected to the male connector 21 and the other end connected to the connector 22. The electric wire 25 has one end connected to the connector 21 and the other end connected to the connector 23. The electric wire 24 is an example of a supply cable, and the electric wire 25 is an example of an output cable. The connector 21, which is an example of the third connector, includes a third positive electrode wire 201*a*, a third negative electrode wire 202*a*, a fourth positive electrode wire 201*b*, and a fourth negative electrode wire 202*b*. The third positive electrode wire 201*a*, which is a conductor, is electrically connected to the terminal 113, and the third negative electrode wire 202*a*, which is a conductor, is electrically connected to the terminal 114. The fourth positive electrode wire 201*b*, which is a conductor, is electrically connected to the third positive electrode wire 201*a*, and the fourth negative electrode wire 202*b*, which is a conductor, is electrically connected to the third negative electrode wire 202*a*. The third positive electrode wire 201*a* and the third negative electrode wire 202*a* are an example of the third path according to the present disclosure, and the fourth positive electrode wire 201*b* and the fourth negative electrode wire 202*b* are an example of the fourth path according to the disclosure. The intersection between the third positive electrode wire 201*a* and the fourth positive electrode wire 201*b* and the intersection between the third negative electrode wire 202*a* and the fourth negative electrode wire 202*b* are examples of the second branch portion according to the present disclosure.

Charger 4 is a charger provided in the vehicle to charge the battery 2. By connecting the connector 22 to the charger 4 and connecting the connector 21 to the terminals 113 and 114 provided in the PCU 1, the charger 4 connects to the terminals via the electric wire 24, the third positive electrode wire 201*a*, and the third negative electrode wire 202*a*. 113 and 114 electrically. The terminal 113 is electrically connected to the terminal 111 through the second positive electrode wire 101*b* and the first positive electrode wire 101*a*, and the terminal 114 is electrically connected to the terminal 112 through the second negative electrode wire 102*b* and the first negative electrode wire 102*a*. The charger 4 connected to the PCU 1 via the second cable 20 is electrically connected to the battery 2 via the PCU 1 and the first cable 10, and supplies DC power to the battery 2.

The electric compressor 5 is a compressor used for air conditioning in a vehicle. A connector 23 is connected to the electric compressor 5. This is done by connecting the connector 21 to terminals 113 and 114 provided in the PCU 1. The electric compressor 5 is electrically connected to the terminals 113 and 114 via the electric wire 25, the fourth positive electrode wire 201*b*, the fourth negative electrode wire 202*b*, the third positive electrode wire 201*a*, and the third negative electrode wire 202*a*. The terminal 113 is electrically connected to the terminal 111 via the second positive electrode wire 101*b* and the first positive electrode wire 101*a*. The terminal 114 is electrically connected to the terminal 112 via the second negative electrode wire 102*b* and the first negative electrode wire 102*a*. Therefore, the electric compressor 5 connected to the PCU 1 via the second cable 20 is electrically connected to the battery 2 via the PCU 1 and the first cable 10, and DC power is supplied from the battery 2.

Figure 2:
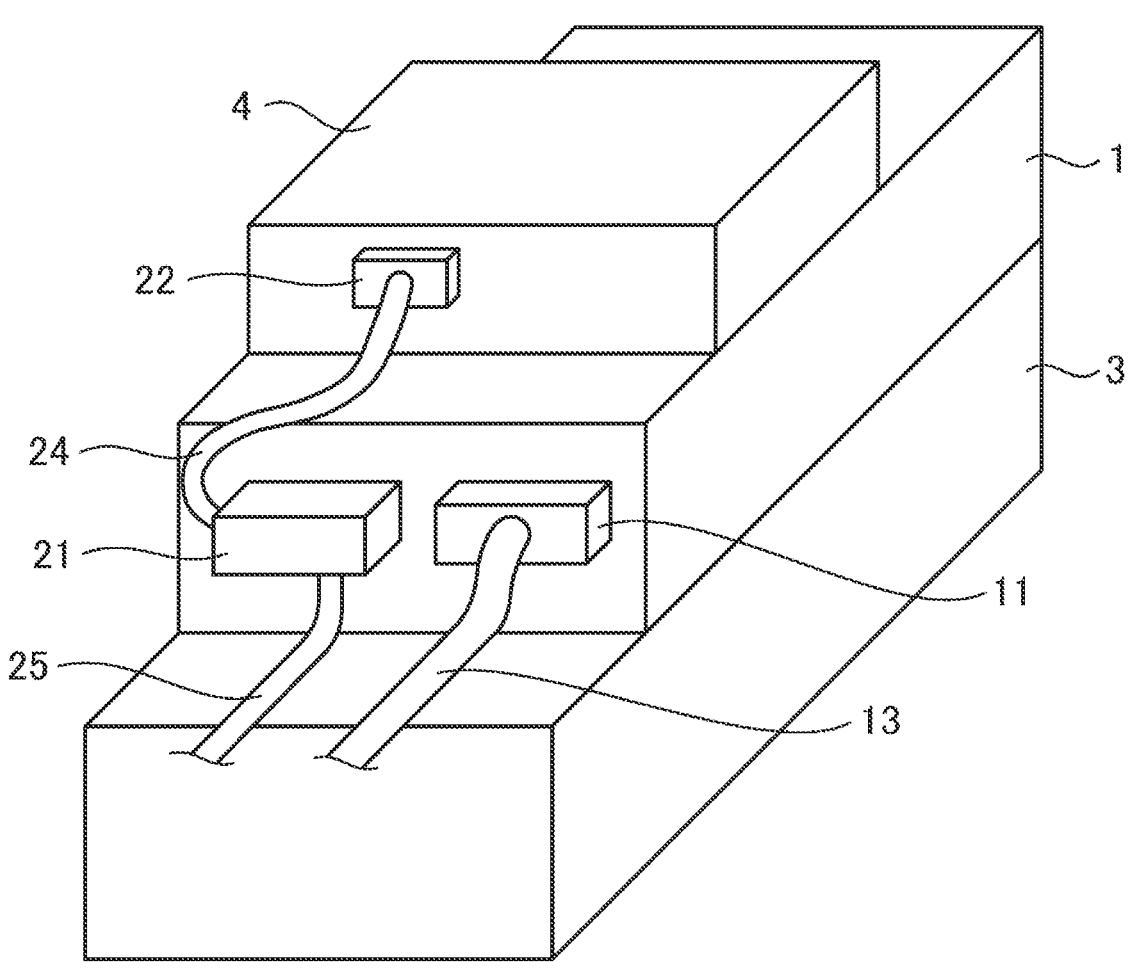
FIG. 2 is a schematic diagram showing an example of the arrangement of a PCU, a motor generator, and a charger.

FIG. 2 is a schematic diagram of an example of the arrangement of the PCU 1, motor generator 3, and charger 4 within the engine compartment. In this example, the PCU 1 is placed above the motor generator 3, and the charger 4 is placed above the PCU 1. A connector 11 of the first cable 10 and a connector 21 of the second cable 20 are connected to the side surface of the PCU 1.

The configuration disclosed in the above-mentioned U.S. Pat. No. 6,582,327 requires a cable for connecting the charging circuit and the branch unit and a cable for connecting the branch unit and the battery case as cables for charging the battery from the charging circuit. As a cable for charging the battery from the inverter unit, a cable is required to connect the inverter unit and the battery case, resulting in a large amount of cables. In contrast, in this embodiment, the power supplied from the inverter 1*b* and the power supplied from the charger 4 are supplied to the battery 2 through the first cable 10. Since a portion is shared between two routes that supply power to the battery 2, the amount of cables routed inside the vehicle can be reduced. Further, in the configuration disclosed in the above-mentioned U.S. Pat. No. 6,582,327, the connector that connects the air compressor and the branch unit and the connector that connects the charging circuit and the branch unit are separate. On the other hand, in this embodiment, the electric compressor 5 and the charger 4 are both electrically connected to the PCU 1 through the connector 21, and share the connection path to the PCU 1 through the connector 21. Therefore, the number of connectors used in the vehicle can be reduced. Further, in this embodiment, the charger 4 is placed on the PCU 1, and the connector 21 is connected to the side surface of the PCU 1. Therefore, the distance between the connector 21 and the charger 4 can be shortened, and the charger 4 and the PCU 1 can be connected in a limited space without complicating wiring. Furthermore, in this embodiment, the PCU 1 is located above the motor generator 3, and the connector 11 is located above the motor generator 3 on the side of the PCU 1. Therefore, the power path between motor generator 3 and connector 11 can be shortened.

Although the embodiments of the present disclosure have been described above, the present disclosure is not limited to the embodiments described above, and can be implemented in various other forms. For example, the above-described embodiment may be modified as follows to implement the present disclosure. Note that the above-described embodiment and the following modified examples may be combined. The present disclosure also includes configurations in which the constituent elements of each embodiment and each modification example described above are combined as appropriate. Further, additional effects and modifications may be easily derived by those skilled in the art. Therefore, the broader aspects of the present disclosure are not limited to the above-described embodiments and modifications, and various changes are possible.

In the embodiment described above, the second cable 20 includes a connector 23 and an electric wire 25. The second cable 20 may be configured without the connector 23 and the electric wire 25.

In the embodiment described above, the connector 23 is connected to the electric compressor 5. The connector 23 is not limited to the electric compressor 5, but may be connected to other devices that consume electric power.

In the present disclosure, the second cable 20 has a power path branched into two at the connector 21. The second cable 20 may have a configuration in which the power path branches into three or more at the connector 21.

What is claimed is:

1. A connection structure comprising:
a housing that houses an inverter that controls a rotary electric machine;
a first connector provided in the housing and to which a first cable connected to a battery is connected;
a second connector provided in the housing and to which a second cable connected to a device that supplies electric power is connected;
a first path that electrically connects the first connector and the inverter; and
a second path that electrically connects the first path and the second connector, wherein:
the second cable includes
a third connector connected to the second connector,
a supply cable that supplies electric power to the third connector, and
an output cable that outputs electric power from the third connector; and
the third connector includes
a third path that electrically connects the second path and the supply cable, and
a fourth path that electrically connects the third path and the output cable.

2. The connection structure according to claim 1, wherein:
the housing is disposed above the rotary electric machine; and
the first connector is provided on a side surface of the housing above the rotary electric machine.

* * * * *